Figure 1:
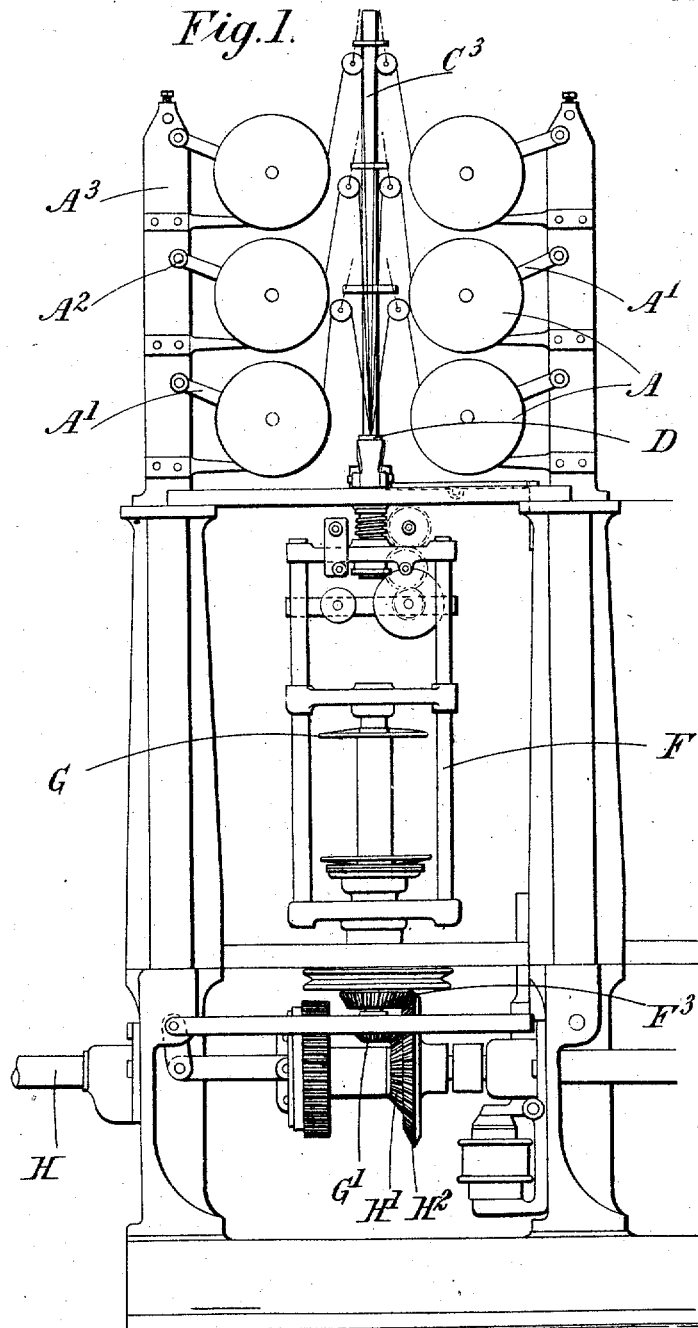

T. SLOPER.
MACHINE FOR MANUFACTURING OR TREATING LENGTHS OF CORD OR OTHER MATERIAL.
APPLICATION FILED JUNE 21, 1909.

986,600.

Patented Mar. 14, 1911.

4 SHEETS—SHEET 1.

Witnesses.
J. J. McCarthy
M. G. Crandell

Inventor.
Thomas Sloper
by Foster Freeman Watson Hoit
Attorneys

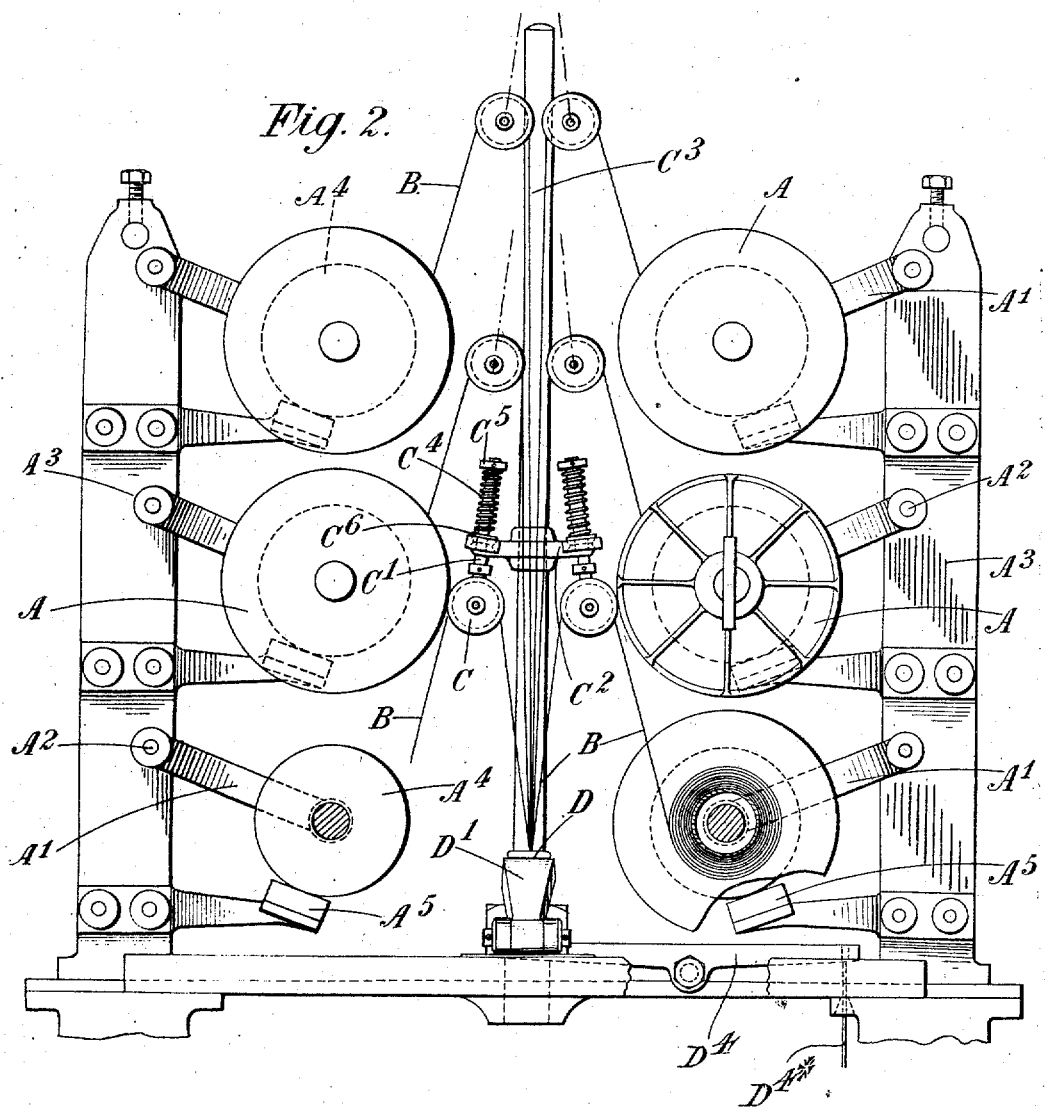

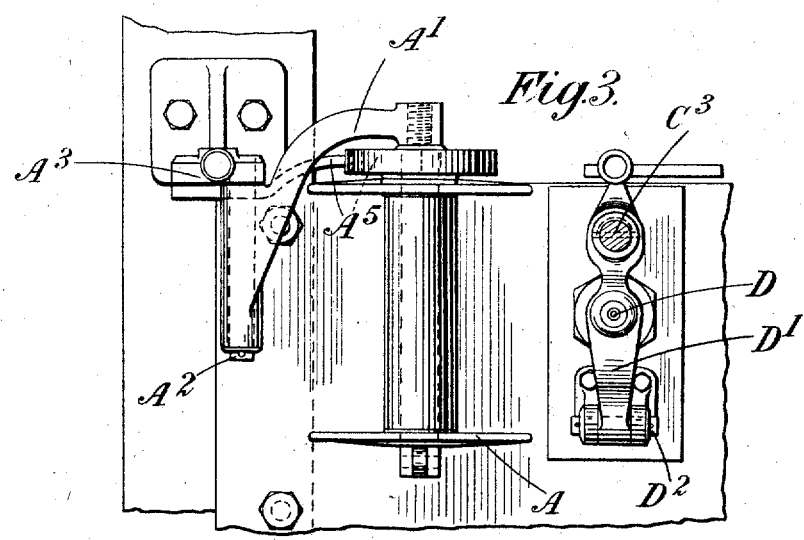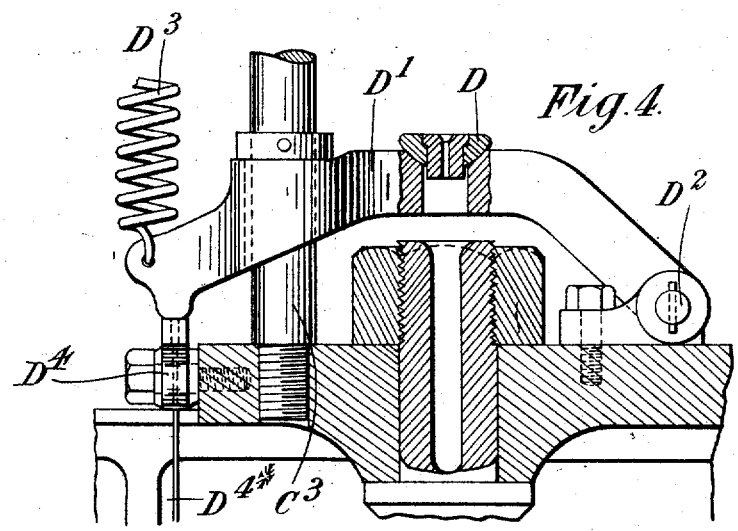

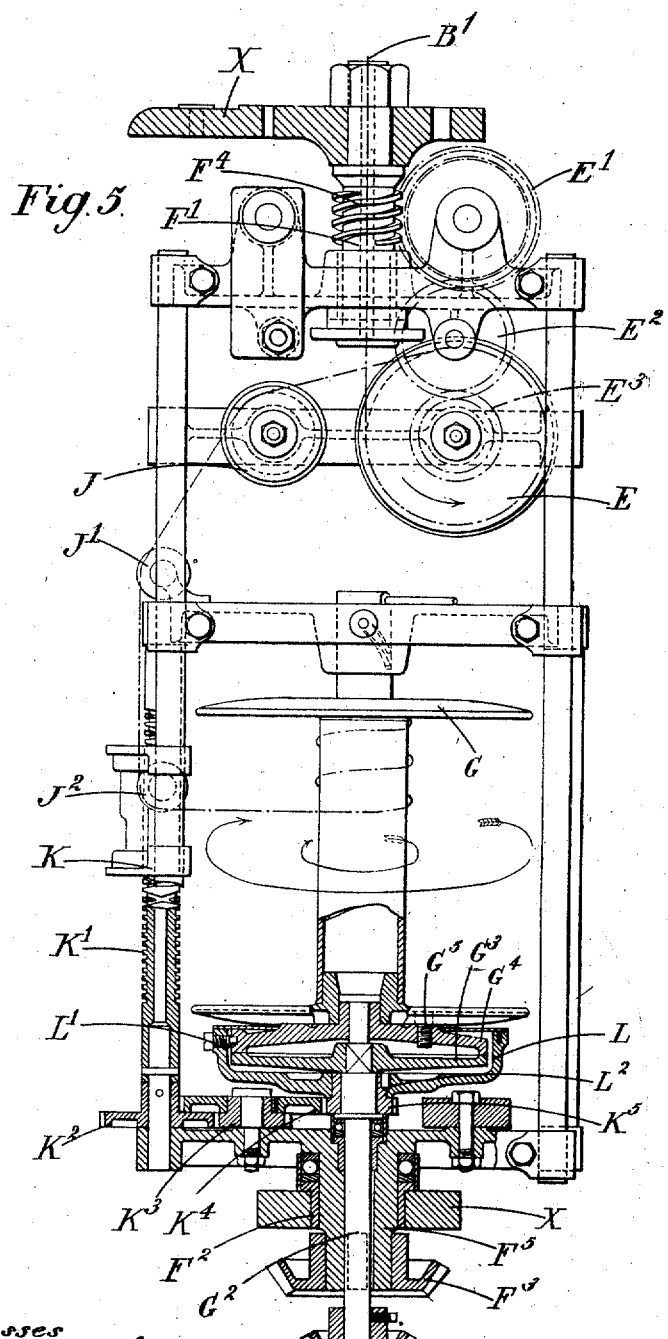

UNITED STATES PATENT OFFICE.

THOMAS SLOPER, OF DEVIZES, ENGLAND.

MACHINE FOR MANUFACTURING OR TREATING LENGTHS OF CORD OR OTHER MATERIAL.

986,600.  Specification of Letters Patent.  Patented Mar. 14, 1911.

Application filed June 21, 1909. Serial No. 503,400.

*To all whom it may concern:*

Be it known that I, THOMAS SLOPER, a subject of the King of England, residing at Devizes, Wiltshire, England, have invented certain new and useful Improvements in Machines for Manufacturing or Treating Lengths of Cord or other Material, of which the following is a specification.

This invention is for improvements in or relating to machines for manufacturing or treating lengths of cord or other material and has for its object to provide apparatus whereby the tension on the length of material under treatment may always be kept constant.

The invention is particularly applicable to cabling or twisting machines and more especially to the manufacture by means of these machines, of rubbered cord such as is used in the manufacture of cord tires. For convenience the invention will be described as applied to a machine for this purpose although the invention is not restricted to cabling machines or to the manufacture or treatment of rubbered cord.

According to one novel feature of this invention each supply bobbin is carried by a movable support, that preferably takes the form of a swinging arm and the bobbin co-operates with a stationary brake block. The movable support permits the bobbin to recede from the brake block should the tension become abnormal and thus the braking effect is decreased during the period of abnormal tension.

Another feature of this invention consists in the employment with a supply bobbin of a guide pulley that receives the material from the bobbin and that is yieldingly controlled to permit movement in such direction as to shorten the line of travel of the material, the pulley also being free to turn about a radial axis to conform with the varying plane occupied by the material as it travels to and from the pulley.

A further feature of this invention consists in the employment with a bobbin of a friction-drive device so arranged that as the amount of material on the bobbin varies (and consequently the tension on the cord or other material tends to vary owing to the difference of leverage exerted by the bobbin when empty and when full) the pressure of one friction member against the other is correspondingly varied and the tension on the material thereby maintained constant.

Various details of construction are hereinafter fully described and their novel features pointed out in the claims.

In the accompanying drawings which illustrate a cabling machine embodying the novel features of this invention: Figure 1 is a diagrammatic view showing the general arrangement of the parts of the machine; Fig. 2 shows in elevation the upper portion of the machine on a larger scale than Fig. 1; Fig. 3 is a plan of the left-hand portion of Fig. 2 with the guide pulleys removed for the sake of clearness; Fig. 4 is a side elevation in part section of a detail shown in Fig. 3 and Fig. 5 is an elevation in part section of the lower half of the machine shown in Fig. 1, but on a larger scale than that figure.

Like letters indicate like parts throughout the drawings.

The bobbins A at the top of the machine supply separate cords or strands B that are to be twisted together to form a single cord. The cords B pass over guide pulleys C and are drawn through a die D. The united cords $B^1$ are drawn through by a positively driven wheel E around which the cord is once lapped to give it a grip. This wheel E is carried in a frame F that rotates bodily on a fixed stud $F^1$ at its upper end and in a bearing $F^2$ at its lower end. Mounted within this frame and rotating in the same direction but at a different speed is a receiving bobbin G on to which the cord is wound. The apparatus receives its motion from a shaft H that carries two bevel wheels $H^1$ $H^2$ which gear with wheels $G^1$ and $F^3$ connected with the bobbin G and frame F respectively.

The upper portion of the machine will now be described in more detail with reference to Figs. 2 and 3.

The supply bobbins A are disposed one above the other in two sets. The number of bobbins employed will vary according to the number of threads or strands it is desired to put together to form the one cord or cable and the machine shown is arranged to cable six strands simultaneously, though the parts necessary for this purpose are not all illustrated in detail, as they are only duplicates one of the other.

Each bobbin is carried on a swinging arm or frame $A^1$ pivoted at $A^2$ to uprights $A^3$.

one on each side of the machine. Each bobbin has at one end a brake-disk $A^4$ and this rests upon a stationary brake-block $A^5$. The strands B from the bobbins A are passed over the guide pulleys C, one guide pulley being allotted to each strand. Each guide pulley is carried by a stem or rod $C^1$ that passes through the end of a bracket $C^2$ on a vertical pillar $C^3$. Surrounding each rod is a spiral spring $C^4$ that lies between a collar $C^5$ fast on the end of the rod and a loose collar $C^6$ threaded on the rod and that rests in a recess in the end of the arm $C^2$. The underside of this collar $C^6$ is spherical in form and the recess in the arm is correspondingly shaped. The strands B after passing over the guide pulleys C are carried down through the die D. This die is carried in a horizontally disposed arm $D^1$ that has one end hinged at $D^2$ to the frame of the machine. The opposite end of the arm has connected to it a spring $D^3$ that tends to lift the arm and bears upon one end of a lever $D^4$. Secured to the other end of this lever is a wire or other operating member $D^{4*}$ that is connected directly or indirectly with any convenient form of clutch or striking gear whereby the machine may be thrown out of action should the arm be depressed.

The stud $F^1$ (Fig. 5) which carries the upper portion of the revolving frame F is secured to a portion of the fixed frame X of the machine and has on it a worm $F^4$. This worm is in engagement with a worm wheel $E^1$ that drives the wheel E through the medium of wheels $E^2$ $E^3$. These wheels are supported in bearings carried by the frame F, and travel around with the frame, the wheel $E^1$ being thus rotated by its engagement with the fixed worm $F^4$.

The rotation of the frame twists the strands B together so that they form a single cord or cable $B^1$ which, as already stated, is lapped once around the wheel E and the wheel being positively driven continuously draws the cord through the die D and passes it on toward the bobbin G. Before reaching the bobbin, the cord is passed over guide pulleys J $J^1$ carried by the frame F and a pulley $J^2$ that is carried by a traverse member K. This member is carried on a rotatable shaft $K^1$ supported in the frame F and having a right and left hand screw-thread whereby the usual traverse motion may be obtained. The shaft $K^1$ is rotated by means of wheels $K^2$ $K^3$ $K^4$ that mesh with a wheel $K^5$ which is free on a central shaft $G^2$ that carries the bevel wheel $G^1$. This shaft $G^2$ has secured to it one member of a friction-drive $G^3$ and the pinion or wheel $K^5$ carries a circular casing L that contains the friction-drive member $G^3$ and an opposed friction-drive member $G^4$ whereon the bobbin G is supported. The bobbin has connection by means of a screw $G^5$ with the member $G^4$ so that it rotates therewith and the casing L is also connected by a screw $L^1$ with the driving member $G^4$ and by a grub-screw $L^2$ with the wheel $K^5$. The bobbin G, the driving member $G^4$, casing L and wheel $K^5$ therefore revolve together and may be considered as one piece. The member $G^3$, however, is fast to the shaft $G^2$ while the member $G^4$ is free thereon and the degree of grip between these two members depends upon the weight of the bobbin G and the character of their opposed surfaces. To obtain a smooth action the casing L is filled with lubricant.

As already stated, the frame F is rotated by means of the bevel wheel $F^3$ which is fast to a hollow stud $F^5$ on the base-plate of the frame. The frame rests upon ball bearings and runs in a brass $F^2$ carried by a stationary portion of the frame X of the machine.

In this machine the gearing is so proportioned that the frame F rotates faster than the bobbin G although both these elements rotate in the same direction. The cord will thus be fed upon the bobbin at a speed equal to the difference of the two speeds of rotation.

The operation of this machine is as follows:—The strands B as they are drawn from their spools sometimes catch owing to the tacky nature of rubbered cords or to one layer perhaps overlapping another on the spool, and the object of the swinging frame $A^1$ with which each spool or bobbin is provided, is to decrease the tension that would be put upon any one thread at such a time by allowing the spool to be lifted from the brake-block $A^5$. It will be seen that if the brake were maintained on the block, the thread would have to overcome this friction as well as that offered by the clinging of the thread to the bobbin, but the swinging frame permits the whole bobbin to be lifted or its weight to be partially taken from the brake-block $A^4$ when any such sticking occurs, and thus undue tension is prevented from being put on the thread.

It has been found in practice that where it is desired to arrange the bobbins A close to the die D or other device through which the threads are to be fed, it is difficult to guide the treads in such manner as to permit their feeding readily from either end of the bobbins. Where the bobbins are situated at some distance from the die, the thread adjusts itself, but to allow them to be brought close to the die and still to provide proper guiding means, the guide pulleys C with their connected parts have been introduced. Should the tension be increased on any one thread or strand, its guide pulley can move downward or in such direction as to shorten the path of travel of the thread against the action of the controlling spring C⁴; also as the thread travels from one end of the bobbin to the other, the guide pulley can swivel in the carrying arm C² so that the pulley always lies approximately in the plane occupied by the thread as it arrives at and leaves the guide pulley. The spherically faced collar C⁶ moreover, allows the guide pulley, with its stem C¹, to rock freely in any direction and thus the pulley always adjusts itself to the thread and tends to generally equalize the tension on the latter.

Should a knot or an unduly large portion occur on any one or more of the threads or strands, the cord will jam in the die D and being still pulled down will cause the arm D¹ that carries the die to be depressed against the action of its spring D³. This through the medium of the lever D⁶ lifts the wire or other operating member D⁴* so that the clutch or striking gear controlled thereby is operated to stop the machine.

As already mentioned above the degree of grip afforded by the friction-drive G³ G⁴ (Fig. 5) depends largely upon the weight of the bobbin and this varies according to the amount of material upon it. It will be seen that if an ordinary friction-drive were introduced and placed as usual outside the rotating frame the tension on the cord B¹ would be least when the bobbin was full as the pull of the cord is then exerted on the bobbin at a point some distance from the center whereas when empty the pull is exerted at a point much nearer the center and thus the friction clutch would only slip with an empty bobbin when the tension on the cord was considerable whereas when full it would slip with the cord under much less tension. By arranging the friction drive, however, beneath the bobbin in the manner described the degree of grip between the operative parts is increased when the bobbin is full (the bobbin then being heavier) so that the effect of the increased leverage is counteracted; similarly when empty the grip between the operative parts of the friction clutch is decreased (the bobbin being lighter) and thus the effect of the decreased leverage through which the pull of the cord is now operating is counteracted.

In actual practice the friction clutch is preferably always slipping but it slips less readily as the bobbin fills owing to the increased weight of the bobbin. If, therefore, the parts are so arranged that the slack of the cord will be just taken up when the bobbin is empty a much more uniform tension can be maintained throughout the whole of the operation than is otherwise possible.

It should be noted that as the screw-threaded spindle K¹ carrying the traverse member K is geared direct to the pinion K⁶ which is fast with the clutch part G⁴ and the bobbin G, the traverse member will always move in right relation to the bobbin.

What I claim as my invention, and desire to secure by Letters Patent is:—

1. In a machine for manufacturing or treating lengths of cord or other material the combination of a receiving bobbin, a friction drive device for rotating the bobbin about its axis and that receives the thrust of the weight of the bobbin, the thrust operating to press one of the friction driving faces against the other, a supply bobbin whence the material is fed to the receiving bobbin, yielding means for controlling the degree of tension put upon the material as it passes from the supply bobbin to the receiving bobbin, and a device for twisting the material after it has left the supply bobbin, and prior to its being wound on the receiving bobbin, substantially as set forth.

2. In a machine for manufacturing or treating lengths of cord or other material, the combination of a supply bobbin, a vertical driving shaft, a friction driving member secured thereto having its engaging face approximately horizontally disposed, an opposed friction member that rests on the engaging face of the first and has driving connection with a barrel or winding stem that is carried by and extends vertically from it, a frame that is rotatable about the barrel or winding stem, a rotatable traverse-shaft carried by the frame in such position as to be carried around the barrel or winding stem by rotation of the frame, a guide on the traverse-shaft over which the material is fed as it passes through the supply bobbin to the barrel or winding stem such guide reciprocating on the traverse-shaft as this rotates about its own axis, and gearing that operatively connects the traverse-shaft with the friction member that carries the barrel or winding stem so that the number of revolutions of the traverse-shaft about its own axis compared with the number of revolutions of the shaft about the barrel or winding stem relatively to the number of revolutions of the barrel or winding stem about its own axis are always in the same ratio, substantially as set forth.

3. In a machine for manufacturing or treating lengths of cord or other material, the combination of, a supply bobbin, a vertical driving shaft, a friction driving member secured thereto and having an approximately horizontally disposed engaging face, an opposed friction member that rests on the first, a vertically disposed receiving bobbin that rests upon the opposed friction member and has driving engagement therewith, a frame that is rotatable about the receiving bobbin, a rotatable traverse-shaft carried by the frame in such position as to be carried around the receiving bobbin by rotation of the frame, a guide on the traverse-shaft over which the material is fed as it passes from the supply bobbin to the receiving bobbin such guide reciprocating on the traverse-shaft as this rotates about its own axis, and gearing that operatively connects the traverse-shaft with the friction member whereon the receiving bobbin rests so that the number of revolutions of the traverse shaft about its own axis compared with the number of revolutions of the shaft about the receiving bobbin relatively to the number of revolutions of the receiving bobbin about its own axis are always in the same ratio, substantially as set forth.

4. In a machine for manufacturing or treating lengths of cord or other material the combination of, a supply bobbin, a vertical driving shaft, a friction driving member secured thereto and having an approximately horizontally disposed engaging face, an opposed friction member that rests on the first and has driving connection with a barrel or winding stem that is carried by and extends vertically from it, a dished casing situated below the friction driving members and that is carried free on the vertical driving shaft, the casing having upwardly extending walls which inclose the driving members and have driving connection with the upper friction member that carries the barrel or winding stem, a frame that is rotatable about the barrel or winding stem, a rotatable traverse-shaft carried by the frame in such position as to be carried around the barrel or winding stem by rotation of the frame, a guide on the traverse-shaft over which the material is fed as it passes from the supply bobbin to the barrel or winding stem, such guide reciprocating on the traverse-shaft as this rotates about its own axis, and gearing that operatively connects the traverse-shaft with the aforementioned casing, substantially as and for the purpose set forth.

5. In a machine for manufacturing or treating lengths of cord or other material, the combination of a receiving bobbin, means for rotating the receiving bobbin about its axis, a supply bobbin whence the material is fed to the receiving bobbin, a brake block coöperating with a part that rotates with the supply bobbin as the material is drawn from it, a pivoted arm whereon the supply bobbin is carried, and a yielding control for maintaining this arm in such position that the brake portion of the bobbin is normally maintained in contact with the brake block, the pivoting of the arm and situation of the brake block being such, however, that the pull of the material tends to swing the arm in such direction as to carry the brake portion of the bobbin away from the brake block, whereby the tension on the material as it is drawn from the supply bobbin is maintained approximately constant, substantially as set forth.

6. In a machine for manufacturing or treating lengths of cord or other material, the combination of a receiving bobbin, means for rotating the receiving bobbin about its axis, a supply bobbin whence the material is fed to the receiving bobbin, a guide pulley over which the material is passed on its way from the supply bobbin to the receiving bobbin, the pulley being situated to one side of both these bobbins, so that the material is approximately doubled back upon itself, yielding control for the pulley to permit movement in such direction as to shorten the line of travel of the material, and a universal joint for supporting the pulley whereby it is free to turn about to conform with the varying planes occupied by the material as it travels to and from the pulley, substantially as set forth.

7. In a machine for manufacturing or treating lengths of cord or other material, the combination of, a receiving bobbin, means for rotating the receiving bobbin about its axis, a supply bobbin whence the material is fed to the receiving bobbin, a guide pulley over which the material is passed on its way from the supply bobbin to the receiving bobbin the pulley being situated to one side of both these bobbins so that the material is approximately doubled back upon itself, a support for the pulley having a spherical recess on that side remote from the pulley, a stem for the pulley which extends through this support the orifice therefor in the support being sufficiently large to allow free play of the stem and being situated concentrically with the aforementioned recess, a spherically-faced collar that is threaded on the stem and whose face engages the recess in the support, and a spring that coöperates between the stem and this collar to keep the latter in the recess, substantially as set forth.

In testimony whereof I have signed my name to this specification in the presence of two subscribing witnesses.

THOMAS SLOPER.

Witnesses:
H. D. JAMESON,
F. H. RAND.